Nov. 27, 1951 W. NUMBERS Re. 23,434

CLOSURE FOR A CONTAINER NECK AND A MEASURING CUP DETACHABLY SECURED IN SAID NECK BY SAID CLOSURE

Original Filed July 5, 1946

WILLIAM NUMBERS
INVENTOR

BY Smith, Russell & Squire
ATTORNEYS

Reissued Nov. 27, 1951

Re. 23,434

UNITED STATES PATENT OFFICE 23,434

CLOSURE FOR A CONTAINER NECK AND A MEASURING CUP DETACHABLY SECURED IN SAID NECK BY SAID CLOSURE

William Numbers, Washington, D. C.

Original No. 2,559,168, dated July 3, 1951, Serial No. 681,513, July 5, 1946. Application for reissue September 28, 1951, Serial No. 248,802

4 Claims. (Cl. 222—114)

Matter enclosed in heavy brackets [ ] appears in the original patent but forms no part of this reissue specification; matter printed in italics indicates the additions made by reissue.

This invention relates to measuring devices and more particularly to measuring devices for use within any container whereby a given or predetermined quantity of liquid, powder or granular solid may be readily obtainable therefrom.

In using various materials such as, for example, medicines, it is often desirable to obtain only a certain amount of the material from the container. To eliminate annoyance and the risk of wasting the material, it is desirable that the device for measuring the required amount of material be associated with the lid or top of the container holding it. The varied amounts of material which may be required at a single time and the varied uses to which it is put make the use of a single measuring device attached to the top of the container impractical.

Accordingly, it is a principal object of this invention to provide a measuring device which is readily insertable in and withdrawable from a container top of given size.

Another object of this invention is to provide a series of measuring or containing devices which may be readily and successively associated with the top of a container.

A feature of this invention relates to the disc-like washer integral with and supporting the liquid measuring receptacle wherein the said washer is threaded to mesh with the threads of an internally threaded top of given diameter.

Another feature of this invention relates to the disc-like washer threadably insertable within the container top wherein said washer serves the dual purpose of supporting the measuring device and sealing the container when the top is substantially tightly screwed thereon.

Another feature of this invention relates to the novel organization, arrangement, and association of parts which cooperate to produce an improved measuring device for obtaining a predetermined amount of material from a given container.

Another object of the invention is the provision of means whereby useful tools and implements such as measuring cups for liquids, powders and granular solids, medicine droppers, liquid measuring tubes, solid and brush applicators for applying liquids, eye cups, automatic liquid measuring devices, liquid or powder storage chambers or the like may be inserted and carried by the inner threads of bottle caps.

Other objects, features and advantages not particularly enumerated are apparent to those skilled in the art as will be evident from the following descriptions.

In the drawings.

Similar numerals designate similar parts throughout the several views.

Figure 1:
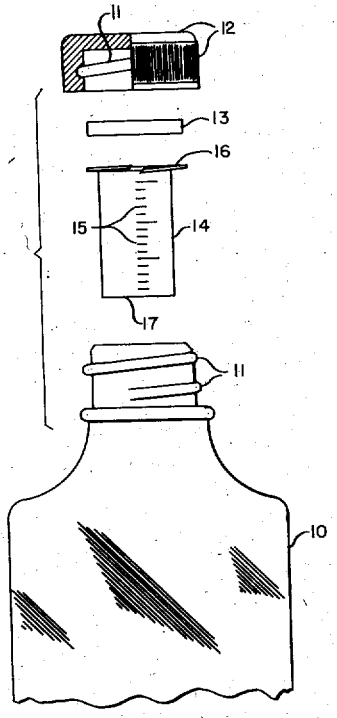
Fig. 1 is an elevational view in exploded form illustrating the principles of this invention.

Referring more particularly to Fig. 1, the medicine bottle 10 represents any container having threads 11 on the periphery of its top portion. Knurled top 12 is threaded so as to be readily threadably engaged with the threads 11. Washer 13 is the conventional type washer which is pressed or fastened into the recess in the top 12 and when that top is tightly screwed onto the bottle 10, it serves to seal that bottle.

The measuring receptacle 14 is of any desired diameter which will allow its insertion into the bottle 10. Scale 15 thereon is graduated to indicate any desired quantities, such as, for example, minim, drops, tablespoonsful, teaspoonsful, et cetera. Receptacle 14 is made integral with disc-like washer 16 and the material used to form these parts may be any suitable material which will not chemically react with the contents of the bottle 10. Washer 16 is thin relative to the washer 13 and is threaded around its periphery to threadably engage cap 12. When washer 16 carrying measuring receptacle 14 is threadably engaged with top 12 and that top tightly screwed onto the bottle 10, the compressive force exerted against washer 16 causes that washer to seal the bottle 10. It is obvious, therefore, that the material used in forming this washer should, in addition to the above requirements, be sufficiently resilient to provide the type seal required.

It is seen that this invention has the further advantage that conventional removable tops require no adaptation prior to their reception of washer 16 since that insertion is made either with washer 13 in its normal position within top 12 or with that washer removed therefrom.

When it is desired to obtain a certain amount of liquid, powder or granular solid from bottle 10, the top 12 carrying the measuring receptacle 14 is removed from the bottle and inverted and the proper amount of material poured into the measuring receptacle 14 through its open end 17. The desired quantity of material is then obtained from the measuring receptacle by utilizing the scale 15 thereon.

Figure 2:
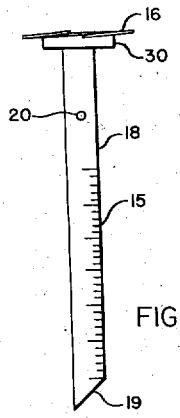
Fig. 2 is an elevational view of a modified form of the invention.

Figure 2 shows another type of measuring applicator 18 having an open end 19 for receiving and discharging the liquid. Scale 15 and washer 16 are as described in connection with Figure 1. Opening 20 through the wall of applicator 18 is located intermediate the scale 15 and washer 16 and provides convenient means for obtaining a certain definite amount of liquid in or from the applicator. Applicator 18 is suspended in a liquid container and the liquid seeks its level in applicator 18 pushing the air out through opening 20. To obtain a definite amount of liquid the top of the container is removed and withdrawn sufficiently from the container to enable one to place a finger over opening 20. All of the liquid in applicator 20 at that time remains therein because of well-known capillary action and the excess is discharged through the end 19 by removing the finger from and replacing it on the opening 20. When scale 15 indicates that applicator 18 contains the desired amount of liquid it may be discharged therefrom by removing the finger from opening 20. In this form of the invention it will be seen that the disc-like portion 16 is strengthened by an annular thickened portion 30.

Figure 3:
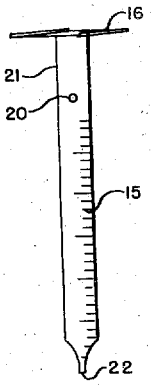
Fig. 3 is an elevational view of another modification of the invention.

Figure 3 shows a dropper-type applicator 21 according to the invention. End 22 of applicator 21 provides means whereby liquid is received into the applicator and discharged therefrom. The operation and use of this applicator is identical with that described in connection with Figure 2 except that the liquid may be readily discharged in quantities of one or more drops at a time. This is because of the relatively small cross-sectional area of end 22.

Figure 4:
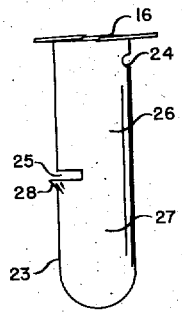
Fig. 4 is an elevational view of a measuring device forming another embodiment of the invention.

Figure 4 shows a device of this invention for automatically providing the same predetermined amount of liquid, powder or granular material each time it is used. Measuring receptacle 23 is provided with an opening 24 located relatively close to the washer 16. Opening 25 oppositely located on the wall of receptacle 23 relative to opening 24 is nearer to the bottom of device 23 than it is to washer 16 or the top of that receptacle. In other words, the portion 26 above opening 25 has a volume greater than that of portion 27 below that opening. Portion 27 has a volume which contains the desired quantity of liquid, such as, for example, a tablespoonful.

If washer 16 is inserted within the top of a liquid container and receptacle 23 is suspended therefrom into a liquid and a predetermined amount of liquid is to be obtained, the container is inverted. When so inverted, the liquid begins to flow immediately into measuring receptacle 23 through opening 24 and air is pushed out of receptacle 23 through opening 25. Assuming there is sufficient liquid in the container this action continues until the device contains an amount of liquid at least equal to the volume of portion 26. The container is now returned to the normal position allowing the liquid in portion 26 to flow into portion 27 until it is filled and then to flow back into the container through opening 25 until all in excess of the volume of portion 27 is returned to the container. The top of the container is now removed and the predetermined amount of liquid contained by portion 27 is obtained therefrom by pouring it through opening 25. This pouring of the liquid is facilitated by a lip 28 located on the outer periphery of receptacle 23 immediately below opening 25. While lip 28 facilitates the final obtaining of the predetermined quantity of liquid, it is obvious that it is not a necessary feature of this invention. It is equally obvious that the construction of receptacle 23 may be such that volume 27 equals any desired volume. It will also be apparent that powders and/or granular solids may be measured by this device in the same manner as above described for liquids.

Figure 5:
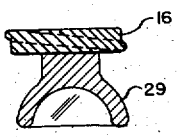
Fig. 5 is an elevational view, partly in section, of an eye-cup adapted for use in accordance with another form of the invention.

Figure 5 shows an eye-cup 29 associated with washer 16 and thereby adapted to the invention as described herein. In this form of the invention it will be seen that the disc-like portion 16 is of thicker construction in order to provide a more sturdy base for the relatively heavy eye cup.

Figure 6:
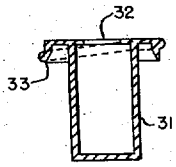
Fig. 6 is a sectional elevational view of a storage chamber for use in accordance with another form of the invention.

In the form of the invention disclosed in Figure 6 there is shown a storage chamber 31 which is especially useful where two associated materials are to be carried in the same container but not in contact with each other. The chamber is provided with an opening 32 at its upper end and the disc-like member is here altered by thickening the outer periphery as indicated at 33.

While there have been here described preferred embodiments of this invention, it is understood that various changes and modifications may be made therein without departing from the spirit of the invention or the scope of the appended claims.

What is claimed as new and desired to be secured by Letters Patent of the United States, is:

1. A device of the character described including, in combination, a container having an exteriorly threaded neck, an interiorly threaded cap engageable with said neck, a compressible washer mounted in said cap, a receptacle having a closed and an open end, and a relatively thin flange of flexible material extending outwardly from the closed end of the receptacle, the periphery of said flange forming a thread of a single convolution engageable with the threads in said cap.

2. A device of the character described including, in combination, a container having an exteriorly threaded neck, an interiorly threaded cap engageable with said neck, a compressible washer mounted in said cap, a receptacle having a closed and an open end, and an integrally formed relatively thin flange of flexible material extending outwardly from the closed end of the receptacle, the periphery of said flange forming a thread of a single convolution engageable with the threads in said cap.

*3. A device of the character described including, in combination, a container having an exteriorly threaded open end, an interiorly threaded cap engageable with said open end, and supporting means for an article removably extending into said container, said supporting means comprising a relatively thin flange of flexible material extending outwardly from the supported article,*

*the periphery of said flange being shaped to form a thread of a single convolution adapted for engagement with the threads in said cap.*

*4. A device as in claim 3 in which said thin flange is formed integrally with said supported article.*

WILLIAM NUMBERS.

REFERENCES CITED

The following references are of record in the file of this patent or the original patent:

UNITED STATES PATENTS

| Number | Name | Date |
|---|---|---|
| 202,268 | Keller | Apr. 9, 1878 |
| 1,047,681 | Moffat | Dec. 17, 1912 |
| 1,937,492 | Merolle | Nov. 28, 1933 |
| 1,949,902 | Desser | Mar. 6, 1934 |
| 2,055,819 | Georger | Sept. 29, 1936 |
| 2,108,692 | Pieck | Feb. 15, 1938 |
| 2,170,173 | Wheatley | Aug. 22, 1939 |
| 2,175,735 | Banks | Oct. 10, 1939 |
| 2,204,471 | Campbell et al. | June 11, 1940 |